US006303717B1

United States Patent
Sen et al.

(10) Patent No.: US 6,303,717 B1
(45) Date of Patent: Oct. 16, 2001

(54) METAL CATALYZED SYNTHESIS OF HYPERBRANCHED ETHYLENE AND/OR α-OLEFIN POLYMERS

(75) Inventors: Ayusman Sen; Jang Sub Kim, both of State College, PA (US); James H. Pawlow, Gainesville, FL (US); Shahid Murtuza, State College, PA (US); Smita Kacker, Annandale, NJ (US); Louis M. Wojcinski, III, State College, PA (US)

(73) Assignee: The Penn State Research Foundation University Park PA, University Park, PA (US)

( * ) Notice: Subject to any disclaimer, the term of this patent is extended or adjusted under 35 U.S.C. 154(b) by 0 days.

(21) Appl. No.: 09/018,048

(22) Filed: Feb. 3, 1998

Related U.S. Application Data (60) Provisional application No. 60/037,209, filed on Feb. 5, 1997.

(51) Int. Cl.$^7$ ...................................................... C08F 4/70
(52) U.S. Cl. ......................... 526/139; 526/141; 526/142; 526/160; 526/161; 526/169.1; 526/169; 526/933; 526/348.6; 526/351; 526/352; 502/117; 502/155
(58) Field of Search ..................................... 526/139, 141, 526/142, 160, 161, 169.1, 169, 933, 348.6, 351, 352

(56) References Cited

FOREIGN PATENT DOCUMENTS

WO 96/23010 * 8/1996 (WO) .
9623010     8/1996 (WO) .
9702298     1/1997 (WO) .

OTHER PUBLICATIONS

Johnson et al., New Pd (II)– wo Ni (II)–Based Catalysts for Polymerization for Ethylene and α–Olefins, J.Am. Chem. Soc. 1995, 117, 6414–6415.
de– Souza et al., (n$^3$ –Methallyl– nickle–dad) PF$_6$complex: new catalyst precursor for ethylene polymerization, Macromol. Rapid Common., 1997,18,795–800.
Pawlow et al., Synthesis of Hyperbranched Polyethylene–Grafted Polystyrene Catalyzed by A II–(Methallyl) Nickel Halide/Lewis Acid System, Polymer Preprints,1997, vol. 38 (2), pp. 277–278.
Wojcinski II,etal., The Palladium (II) Catalyzed Synthesis of Hyperbranched Olefin Oligomers, Polymer Preprints, 1997, vol. 38(2),pp. 273–274.

* cited by examiner

Primary Examiner—David W. Wu
Assistant Examiner—R. Rabago
(74) Attorney, Agent, or Firm—Thomas J. Monahan; Anthony J. DeLaurentis (57) ABSTRACT

Oily hyperbranched polymers derived from ethylene, propylene, butene and/or a $C_5$–$C_{24}$ α-olefin, and a method for their synthesis, are disclosed. The polymers have non-regular microstructures and are characterized by a ratio (ℜ)of methyl hydrogens centered around 0.85 ppm on the 1H-NMR spectra of the polymers relative to total aliphatic hydrogens of from about 0.40 to about 0.65 for polymers derived from ethylene or butene, and a ratio (ℜ)of from greater than 0.50 to about 0.65 for polymers derived from propylene. A method for grafting hyperbranched polymers derived from ethylene, propylene, butene and/or a $C_5$–$C_{24}$ α-olefin onto aromatic rings in organic molecules and polymers, and the resulting grafted materials, are also disclosed. The hyperbranched polymers and grafted materials are useful, for example, as lubricants and lubricant additives.

12 Claims, 1 Drawing Sheet

FIGURE 1

METAL CATALYZED SYNTHESIS OF HYPERBRANCHED ETHYLENE AND/OR α-OLEFIN POLYMERS

This application is based on U.S. Provisional Application No. 60/037,209, filed Feb. 5, 1997.

This invention was developed under grant No. DE-FG02-84ER13295 from the U.S. Department of Energy

FIELD OF THE INVENTION

This invention relates to hyperbranched polymers that are synthesized from ethylene, propylene, butene and/or $C_5$–$C_{24}$ α-olefins, and to a method for their synthesis. The polymers are viscous oils having a non-regular microstructure. The ethylene polymers and the butene polymers are characterized by a ratio ($\Re$)of methyl hydrogens centered around 0.85 ppm in $^1$H-NMR spectra relative to the total aliphatic hydrogens of from about 0.40 to about 0.65, while the propylene polymers are characterized by a ratio ($\Re$)of methyl hydrogens centered around 0.85 ppm in $^1$H-NMR spectra relative to the total aliphatic hydrogens of from greater than 0.50 to about 0.65. This invention also relates to a method for grafting hyperbranched polymers onto aromatic rings in organic molecules and polymers, and to the resulting grafted materials. The hyperbranched polymers and the grafted materials of this invention are useful, for example, as lubricants and lubricant additives.

BACKGROUND OF THE INVENTION

The polymerization of ethylene, propylene and α-olefins by transition metal catalysts leads principally to the formation of linear polymers. However, in a recent international application published under the Patent Cooperation Treaty (PCT Application No. WO 96/23010), it has been disclosed that polymers having a moderate degree of branching can be synthesized by using palladium and nickel catalysts incorporating very bulky chelating α-diimine bidentate ligands. The PCT application discloses, for example, polyolefins having about 80 to about 150 branches per 1000 methylene groups, wherein for every 100 branches that are methyl branches, there are about 30 to about 90 ethyl branches, about 4 to about 20 propyl branches, about 15 to about 50 butyl branches, about 3 to about 15 amyl branches, and about 30 to about 140 hexyl or longer branches. The olefin polymers described in the PCT application are said to be useful as elastomers, molding resins, in adhesives, etc. Polymers containing monomer units derived other than from olefins are also disclosed in the PCT application; and polymers which contain olefin and olefinic ester monomer units, particularly copolymers of ethylene and methyl methacrylate and/or other acrylic esters, are said to be useful as viscosity modifiers for lubricating oils. The basis for the above PCT Application is believed to be an article by Johnson et al, published in the Journal of the American Chemical Society (New Pd(II)- and Ni(II)-Based Catalysts for Polymerization of Ethylene and α-Olefins, J. Am. Chem. Soc. 1995, 117, 6414–6415).

Another recent international patent application (PCT Application No. WO 97/02298) relates to the preparation of polyolefins by coordination polymerization of ethylene, styrene or norbornene using a catalyst comprising (a) a zerovalent tricoordinate or tetracoordinate nickel compound which has at least one labile ligand, (b) an acid of the formula HX, where X is a noncoordinating anion, and (c) at least one bulky ligand selected from a specified group thereof. At page 29, lines 25 et seq. of that PCT Application, it is suggested that the following materials (among others) should be absent during the polymerization process, or at least should not be present in an amount sufficient to affect the course of the polymerization: an organoaluminum compound; an aluminum halide; and any organometallic compound except for the nickel compounds. The polymers prepared in accordance with that PCT Application are moderately branched and are said to be useful as molding resins, films and elastomers.

Moderately branched ethylene polymers are also disclosed by de Souza et al in an article published in September 1997 ([$\eta^3$-methallyl-nickel-dad] $PF_6$ Complex: New Catalyst Precursor For Ethylene Polymerization, Macromol. Rapid Commun., 1997,18,795–800). In that article, which was published after the provisional application on which this application is based, it is disclosed that [$^3$-methallyl-nickel-dad]$PF_6$is active as an ethylene polymerization catalyst when used in the presence of usual organoaluminum compounds such as diethylaluminum chloride, at low Al/Ni ratios and under mild reaction conditions.

While the hydrocarbon polymers prepared in accordance with the above-discussed PCT applications and de Souza article are characterized by a moderate degree of branching, there remains a need for relatively high molecular weight, hyperbranched, viscous, liquid hydrocarbon polymers and to a method for their preparation from simple and inexpensive olefins such as ethylene and propylene. A need also remains for derivatives of such hyperbranched hydrocarbon polymers, such as those prepared by grafting the liquid hyperbranched hydrocarbon polymers onto an aromatic ring in an organic compound or polymer, as well as to facile methods for preparing such derivatives.

SUMMARY OF THE INVENTION

The degree of branching of a hydrocarbon polymer can be estimated from the ratio ($\Re$)of methyl hydrogens centered around 0.85 ppm in the $^1$H-NMR spectra of the polymer relative to the total aliphatic hydrogens in the polymer, with a higher ratio indicating greater branching. For linear polyethylene, $\Re$ is 0, indicating that there is no branching. For ethylene polymers of the type disclosed in the above-discussed PCT applications and de Souza et al article, $\Re$ is as high as about 0.30, indicating a moderate degree of branching. For the ethylene polymers and the butene polymers of this invention, $\Re$ is at least about 0.40. Typically, for ethylene polymers and butene polymers of this invention, $\Re$ is from about 0.40 to about 0.65, and such polymers are referred to as being "hyperbranched." The ratio $\Re$ for the hyperbranched propylene polymers of this invention is greater than 0.50, and is as high as about 0.65, e.g. from about 0.54 to about 0.65.

It is an object of the present invention to provide novel hyperbranched, liquid, hydrocarbon polymers having a molecular weight ($M_w$), determined by GPC relative to polystyrene standards, in excess of about 300.

Yet another object is to prepare viscous oily hyperbranched hydrocarbon polymers that are useful as lubricants and lubricant additives by polymerizing ethylene and/or propylene and/or butene and/or a $C_5$–$C_{24}$ α-olefin in the presence of a transition compound, preferably a nickel or palladium compound, together with a substantial molar excess of a Lewis acid and, optionally, a nitrogen, oxygen, phosphorus or mixed nitrogen and/or oxygen and/or phosphorus based ligand.

Another object is to prepare liquid hydrocarbon polymers from readily available olefins, such, for example, ethylene, propylene, 1-butene, 2-butene, 1-hexene, 1-dodecene and mixtures thereof.

Another object is to provide hyperbranched polymeric materials by grafting the present liquid hyperbranched hydrocarbon polymers onto an aromatic ring in an organic compound or polymer.

Still other objects are to provide facile methods for preparing the present liquid hyperbranched polymers and grafted materials.

These and other objects and advantages of the present invention are accomplished, in accordance with one aspect of the invention, by polymerizing ethylene and/or propylene and/or butene and/or a $C_5$ to $C_{24}$ α-olefin in the presence of a solvent and a catalyst system comprising a transition metal component, preferably a nickel or palladium component, in combination with a substantial molar excess of a Lewis acid of the general formula $AlX_xR_{3-x}$, where X is a halogen, such as Cl or Br, R is a lower alkyl, such as methyl, ethyl, propyl or butyl, and x is 0 to 3. In another aspect of the invention, a nitrogen, oxygen, phosphorus or mixed nitrogen and/or oxygen and/or phosphorus based ligand may be added to the reaction medium. The optional ligand may comprise a monodentate ligand, such as tri(cyclohexyl)phosphine, tri(tert-butyl)phosphine, tri(phenyl)phosphine or pyridine, and/or a bidentate ligand, such as 1,3-bis(diphenylphosphino)propane (dppp), 1,3-bis(diisopropylphosphino) propane (dippp), 1,3-bis(diphenylphosphino)ethane (dppe) or 2,2'-dipyridyl, and/or a tridendate ligand, such as bis(2-diphenylphosphinoethyl)phenylphosphine (triphos).

In one preferred aspect of the invention, hyperbranched viscous liquid polymers are prepared from ethylene as the sole monomer. In other aspects, ethylene may be replaced with or used in combination with propylene and/or butene and/or a $C_5$–$C_{24}$ α-olefin, such as, for example, 1-pentene, 1-hexene or 1-dodecene.

The polymerization preferably is carried out in the liquid phase using a halogenated solvent, such as chloroform ($CHCl_3$) or chlorobenzene ($C_6H_5Cl$). Other halogenated solvents that may be used as the polymerization medium include, for example, methylene chloride ($CH_2Cl_2$), tetrachloroethane ($C_2H_2Cl_4$) or dichlorobenzene ($C_6H_4Cl_2$). In some cases, it has been found that the polymerization can be carried out in a hydrocarbon solvent, such as hexane. Optionally, when a hydrocarbon solvent is employed, a small amount (e.g., 5% of the total solvent volume) of a halogenated organic solvent may be present.

The catalyst system used in the synthesis of the hyperbranched polymers of the invention comprises a catalytically effective amount of a transition metal component and a substantial molar excess of Lewis acid component. The transition metal component typically comprises a nickel compound, such as (π-methallyl)Ni(Br) dimer, or a palladium compound, such as (1,5-cyclooctadiene) Pd($CH_3$)(Cl). Unlike the transition metal catalysts of the prior art, (such as those of the above-discussed PCT applications, which contain bulky ligands), the transition metal components contemplated for use in the present invention may be used with more common and simple ligands. In fact, it has been found that highly branched polymers can be prepared in the absence of any ligands when using a nickel or palladium component in conjunction with an excess of Lewis acid.

In addition to the nickel and palladium components mentioned above, other nickel and palladium components which may be use in the invention include, for example, nickel acetylacetonate, Ni(1,5-cyclooctadiene)$_2$, [Ni((meth) allyl) (trifluoroacetate)]$_2$, $PdCl_2$, Pd(1,5-cyclooctadiene)$Cl_2$ and alkyl, aryl and halide complexes of nickel and palladium.

Although the use of nickel and palladium components is preferred, hyperbranched polymers can be prepared in accordance with the invention using other transition metal components in combination with an excess of Lewis acid. Transition metal components contemplated for use in the present invention include those wherein the transition metal is selected from Group 6B (Cr, Mo, W), Group 7B (Mn, Tc, Re), Group 8 (Fe, Co, Ni, Ru, Rh, Pd, Os, Ir, Pt) and Group 1B (Cu, Ag, Au); and hyperbranched polymers have been synthesized using acetylacetonate complexes of manganese, cobalt and iridium, as well as using (1,5-cyclooctadiene) Rh(Cl) dimer.

The Lewis acid component of the present catalyst system may be represented by the general formula $AlX_xR_{3-x}$, where R is a lower alkyl (e.g., methyl, ethyl, propyl, etc., and preferably ethyl), X is halogen (e.g., Cl or Br, and preferably Cl), and x is 0 to 3. The degree of branching appears to be dependent upon the Lewis acid that is used, with higher degrees of branching being obtained with trialkyl aluminum compounds than with aluminum halides. The Lewis acid component should be used in a substantial molar excess relative to the transition metal component. Typically, the Lewis acid component should be used in an amount of from about 2 to about 50 moles per mole of transition metal component. Preferably, the Lewis acid should be used in an amount of from about 5 to about 30 moles per mole of transition metal component, and more preferably from about 10 to about 20 moles per mole of transition metal component.

As indicated above, the present catalyst system need not contain any ligands. However, a nitrogen, oxygen or phosphorus based ligand or a mixed nitrogen and/or oxygen and/or phosphorus based ligand may be added to the catalyst system as an optional component. The optional ligands include monodendate ligands, such as tri(cyclohexyl) phosphine, tri(tert-butyl)phosphine, tri(phenyl)phosphine or pyridine, as well as bidentate ligands, such as 1,3-bis (diphenylphosphino)propane (dppp), 1,2-bis(diphenylphosphino)ethane (dppe),or 2,2'-dipyridyl and/or tridentate ligands, such as bis(2-diphenylphosphinoethyl)phenyl phosphine (triphos).

The polymerization in accordance with this invention may be carried out at temperatures ranging from about 0° to about 80° C. Typically, however, the polymerization will be carried out at a temperature of from about 20° to about 50° C. The pressure at which the polymerization is carried out is not critical, with pressures ranging from 15 psi to 1500 psi being suitable.

The transition metal component may be added to the polymerization medium as a solid or in solution, or it may be supported on a solid carrier, such as silica gel.

In accordance with another aspect of the invention, it has been found that when the halogenated solvent is replaced with an aromatic compound susceptible to Friedel-Crafts alkylation, the resulting branched polymers are aryl-capped. For example, under the reaction conditions set forth herein and described more fully in the examples, when ethylene is polymerized in the presence of benzene as the aromatic compound, the polymerization results in the formation of phenyl-capped branched polymers, typically having a degree of branching ℜ of at least about 0.40. The $^1$H-NMR (CDCl$_3$) spectra of the phenyl-capped branched polymers are very similar to those of non-capped hyperbranched polymers prepared in the presence of halogenated solvents, except for the additional resonances at 2.60 and 3.02 ppm due to hydrogen(s) on the carbon directly bonded to the aromatic ring (i.e., benzylic hydrogens). Similar grafting of branched polymer derived from ethylene was observed when ethylene was polymerized in the presence of toluene, xylene or naphthalene.

In still another aspect of the invention, it is possible to graft branched polymer tails derived from ethylene and/or propylene and/or butene and/or a C$_5$–C$_{24}$ α-olefin onto the pendant phenyl groups of polymers such as polystyrene.

Although the mechanism of branching in the present invention is not completely understood, the various aspects of the invention will be appreciated more fully in light of the following illustrative examples. (In all examples and claims, the $^1$H-NMR values disclosed are related to a reference compound of TMS at 0 ppm.)

EXAMPLE 1

[Ni(π-methallyl)(Br)]$_2$/AlCl$_3$ in hexane

Figure 1:
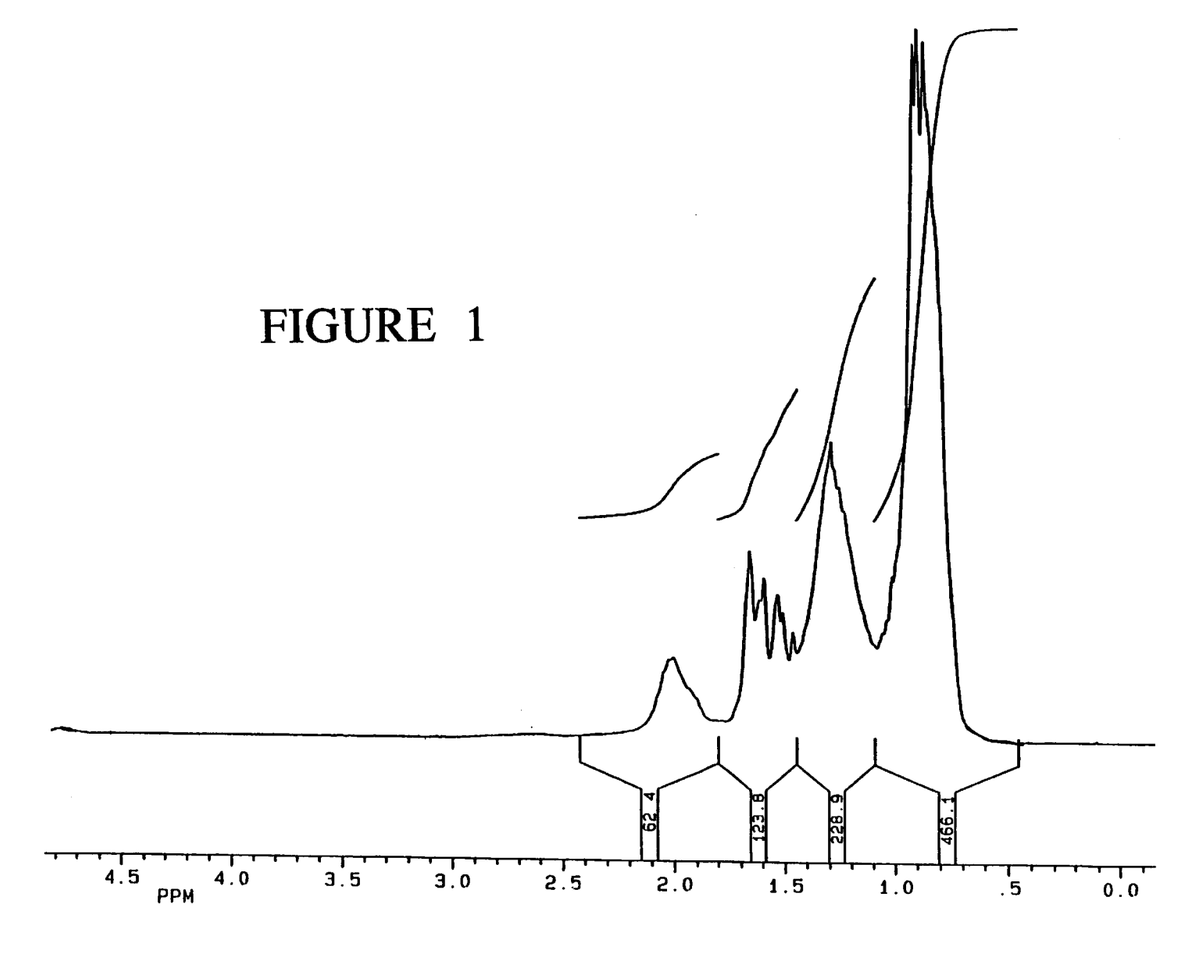
FIG. 1 shows the $^1$H-NMR spectrum of the product of Example 1.

In a glove box, under an inert atmosphere (nitrogen), 5 mg (0.013 mmol) of nickel compound ([Ni(π-methallyl)(Br)]$_2$) and 35 mg (0.26 mmol) AlCl$_3$ of were added to 10 ml of hexane in a glass autoclave liner. The glass liner was inserted into a stainless steel autoclave, and the autoclave was assembled in the glove box. At room temperature, the autoclave was charged to 800 psi with ethylene (single charge), and the polymerization was allowed to continue for 30 minutes at room temperature. At the end of 30 minutes, the polymerization was discontinued, and excess ethylene was vented. The resulting polymer solution was eluted through alumina to remove catalyst impurities, and volatiles were removed at room temperature and 0.1 torr to yield 1.10 g of polyethylene as a clear viscous liquid. The resulting polyethylene had degree of branching (ℜ)of 0.53. The degree of branching (determined by integration of the $^1$H-NMR spectrum of the polymer) is the ratio of methyl hydrogens centered around 0.85 ppm, which must be either at the end of a polymer chain, or the end of a branch, relative to the total number of aliphatic hydrogens in the polymer. The $^1$H-NMR spectrum for this polymer is illustrated in the attached Figure. As illustrated, the ratio ℜ=466.1/(466.1+228.9+123.8+62.4)=0.53.

EXAMPLE 2

[Ni(π-methallyl) (Br)]$_2$/dppe/AlCl$_3$ in C$_6$H$_5$Cl

In a glove box, under an inert atmosphere (nitrogen), 5 mg (0.013 mmol) of nickel compound ([Ni(π-methallyl) (Br)]$_2$) and 11 mg (0.026 mmol) of 1,2-bis(diphenylphosphino) ethane (dppe) were stirred together for 10 minutes in 5 ml of C$_6$H$_5$Cl. The resulting solution was added to a glass autoclave liner containing 35 mg (0.26 mmol) of AlCl$_3$ suspended in an additional 5 ml of C$_6$H$_5$Cl. The glass liner was inserted into a stainless steel autoclave, and the autoclave was assembled in the glove box. At room temperature, the autoclave was connected to a constant feed of ethylene at 800 psi, and the polymerization was allowed to continue for 30 minutes. At the end of 30 minutes, the polymerization was discontinued, and excess ethylene was vented. The resulting polymer solution was eluted through alumina to remove catalyst impurities, and vacuum distilled at 120° C. and 0.1 torr to yield 0.7 g of polyethylene as a clear viscous liquid. The polyethylene had a molecular weight (M$_w$) of 1060 (determined by GPC relative to polystyrene standards) and a degree of branching (ℜ)of 0.42. The degree of branching was determined by integration of the $^1$H-NMR spectrum of the polymer to determine the ratio of methyl hydrogens centered around 0.85 ppm to the total number of aliphatic hydrogens.

EXAMPLE 3

(1,5-cyclooctadiene)Pd(CH$_3$) (Cl)/dppp/AlCl$_3$ in CHCl$_3$

In a glove box, under an inert atmosphere (nitrogen), 20 mg (0.076 mmol) of palladium compound ((1,5-cyclooctadiene)Pd(CH$_3$) (Cl)) and 32 mg (0.076 mmol) of 1,2-bis(diphenylphosphino)propane (dppp) were stirred together for 10 minutes in 5 ml of CHCl$_3$. The resulting solution was added to a glass autoclave liner containing 100 mg (0.76 mmol) of AlCl$_3$ suspended in an additional 5 ml of CHCl$_3$. The glass liner was inserted into a stainless steel autoclave, and the autoclave was assembled in the glove box. The autoclave was charged to 800 psi with ethylene (single charge), and polymerization was allowed to continue for 16 hours at 50° C. At the end of 16 hours, the polymerization was discontinued, and excess ethylene was vented. The resulting polymer solution was eluted through alumina to remove catalyst impurities, and the volatiles were removed at 50° C. and 0.1 torr to yield 3.2 g of hyperbranched polyethylene as a clear viscous liquid. The polyethylene had a molecular weight (M$_w$) of 600 and a degree of branching of 0.55.

EXAMPLE 4

[Ni(π-methallyl)(Br)]$_2$/AlCl$_3$ in C$_6$H$_6$

In a glove box, under an inert atmosphere (nitrogen), 5 mg (0.013 mmol) of nickel compound ([Ni(π-methallyl)(Br)]$_2$) and 35 mg (0.26 mmol) of AlCl$_3$ were stirred together in 10 ml of benzene (C$_6$H$_6$) in a glass autoclave liner. The glass liner was inserted into a stainless steel autoclave, and the autoclave was assembled in the glove box. At room temperature, the autoclave was connected to a constant feed of ethylene at 800 psi, and the reaction was allowed to continue for 30 minutes. At the end of 30 minutes, the product mixture was eluted through silica with CH$_2$Cl$_2$ and the volatiles were removed at room temperature and 0.1 torr to yield 5.3 g of branched alkyl-grafted benzene as a colorless oil. The M$_w$ of the branched alkyl-grafted benzene was 300 and the ratio (ℜ)of methyl hydrogens centered around 0.85 ppm to total aliphatic hydrogens was 0.47.

EXAMPLE 5

[Ni(πmethallyl)(Br)]$_2$/AlCl$_3$/poly(styrene) in C$_6$H$_5$Cl

In a glove box, under an inert atmosphere (nitrogen), 0.5 g of polystyrene having a molecular weight (M$_w$) of 360,000 was dissolved in 5 ml of C$_6$H$_5$Cl in a glass autoclave liner. To the resulting solution, there was added 5 mg (0.013 mmol) of nickel compound ([Ni(π-methallyl) (Br)]$_2$) and 17 mg (0.13 mmol) of AlCl$_3$. The glass liner was inserted into a stainless steel autoclave, and the autoclave was assembled in the glove box. At room temperature, the autoclave was connected to a constant feed of ethylene at 600 psi, and the reaction was allowed to continue for 24 hours. At the end of 24 hours, the feed of ethylene was discontinued, and excess ethylene was vented. The resulting polymer solution was diluted to 45 ml with $CHCl_3$ and added with stirring to 250 ml of methanol to precipitate the polymer as a white solid. The polymer was filtered and dried under vacuum to yield 0.6 g of branched alkyl-grafted polystyrene. The ratio on non-aromatic hydrogens to aromatic hydrogens was found to be 1.48.

EXAMPLE 6

[Ni(π-methallyl)(Br)]$_2$/AlCl$_3$ in CHCl$_3$

In a glove box, under an inert atmosphere (nitrogen), 5 mg (0.013 mmol) of nickel compound ([Ni(π-methallyl)(Br)]$_2$) and 35 mg (0.25 mmol) AlCl$_3$ were added together with 10 ml of solvent (CHCl$_3$) in a glass autoclave liner. The glass liner was inserted into a stainless steel autoclave, and the autoclave was assembled in the glove box. At room temperature (25° C.), the autoclave was connected to a constant feed of ethylene at 800 psi, and the polymerization was allowed to continue for 30 minutes. At the end of 30 minutes, the polymerization was discontinued, and excess ethylene was vented. The resulting polymer solution was eluted through alumina to remove catalyst impurities, and vacuum distilled at 50° C. and 0.1 torr to yield 2.9 g of hyperbranched polyethylene as a clear viscous liquid. The polyethylene had a molecular weight ($M_w$) of 800 and a molecular weight distribution ($M_w/M_n$) of 1.2 (determined by GPC relative to polystyrene standards). The polyethylene had a ratio ($\Re$) of methyl hydrogens centered around 0.85 ppm to total aliphatic hydrogens (by $^1$H NMR integration) of 0.53.

EXAMPLE 7

[Ni(π-methallyl)(Br)]$_2$/AlCl$_3$ in C$_6$H$_5$Cl

The procedure of Example 6 was repeated, except the C$_6$H$_5$Cl was used in place of CHCl$_3$ as the solvent. The resulting polymer (3.6 g) had a molecular weight ($M_w$) of 450 and a molecular weight distribution ($M_w/M_n$) of 1.2 (determined by GPC relative to polystyrene standards), and a ratio ($\Re$) of methyl hydrogens centered around 0.85 ppm to total aliphatic hydrogens (by $^1$H NMR integration) of 0.49.

EXAMPLE 8

[Ni(π-methallyl)(Br)]$_2$/dppe/AlCl$_3$ in C$_6$H$_5$Cl

The procedure of Example 7 was repeated, except that 0.025 mmol of 1,2-bis(diphenylphosphino)ethane (dppe) was added to the glass autoclave liner along with the catalyst system. The resulting polymer (3.5 g) had a molecular weight ($M_w$) of 1010 and a molecular weight distribution ($M_w/M_n$) of 1.3 (determined by GPC relative to polystyrene standards), and a ratio ($\Re$) of methyl hydrogens centered around 0.85 ppm to total aliphatic hydrogens (by $^1$H NMR integration) of 0.43.

EXAMPLE 9

[Ni(π-methallyl)(Br)]$_2$/dppp/AlCl$_3$ in C$_6$H$_5$Cl

The procedure of Example 7 was repeated, except that 0.025 mmol of 1,2-bis(diphenylphosphino)propane (dppp) was added to the glass autoclave liner along with the catalyst system. The resulting polymer (2.2 g) had a molecular weight ($M_w$) of 800 and a molecular weight distribution ($M_w/M_n$) of 1.2 (determined by GPC relative to polystyrene standards), and a ratio ($\Re$) of methyl hydrogens centered around 0.85 ppm to total aliphatic hydrogens (by $^1$H NMR integration) of 0.42.

EXAMPLE 10

[Ni(π-methallyl)(Br)]$_2$/AlBr$_3$ in C$_6$H$_5$Cl

The procedure of Example 7 was repeated, except that AlBr$_3$ was used in place of AlCl$_3$ as the Lewis acid component of the catalyst. The resulting polymer (3.6 g) had a molecular weight ($M_w$) of 490 and a molecular weight distribution ($M_w/M_n$) of 1.1 (determined by GPC relative to polystyrene standards), and a ratio ($\Re$) of methyl hydrogens centered around 0.85 ppm to total aliphatic hydrogens (by 1H NMR integration) of 0.57.

EXAMPLE 11

[Ni(π-methallyl)(Br)]$_2$/Al(C$_2$H$_5$)$_3$ in CHCl$_3$

In a glove box, under an inert atmosphere (nitrogen), 28.8 mg (0.075 mmol) of nickel compound ([Ni(π-methallyl)(Br)]$_2$) and 85 mg (0.75 mmol) Al(C$_2$H$_5$)$_3$ were added together with 10 ml of solvent (CHCl$_3$) in a glass autoclave liner. The glass liner was inserted into a stainless steel autoclave, and the autoclave was assembled in the glove box. The autoclave was heated to 55° C. and was charged to 800 psi with ethylene (single charge) to begin polymerization. The polymerization was allowed to continue for 16 hours. At the end of 16 hours, the polymerization was discontinued, and excess ethylene was vented. The resulting polymer solution was eluted through alumina to remove catalyst impurities, and vacuum distilled at 50° C. and 0.1 torr to yield 3.0 g of hyperbranched polyethylene as a clear viscous liquid. The polyethylene had a molecular weight ($M_w$) of 580 and a molecular weight distribution ($M_w/M_n$) of 1.2 (determined by GPC relative to polystyrene standards), and a ratio ($\Re$) of methyl hydrogens centered around 0.85 ppm to total aliphatic hydrogens (by $^1$H NMR integration) of 0.52.

EXAMPLE 12

[Ni(π-methallyl)(Br)]$_2$/dbu/Al(C$_2$H$_5$)$_3$ in CHCl$_3$

The procedure of Example 11 was repeated, except that 0.052 mmol of 1,8-diazabicyclo[5.4.0]undec-7-ene (dbu) was added as an optional ligand to the reaction medium. The resulting polyethylene product (1.3 g) had a molecular weight ($M_w$) of 370 and a molecular weight distribution ($M_w/M_n$) of 1.1 (determined by GPC relative to polystyrene standards), and a ratio ($\Re$) of methyl hydrogens centered around 0.85 ppm to total aliphatic hydrogens (by $^1$H NMR integration) of 0.54.

EXAMPLE 13

[Ni(π-methallyl)(Br)]$_2$/dppp/Al(C$_2$H$_5$)$_3$ in CHCl$_3$

The procedure of Example 11 was repeated, except that 0.075 mmol of 1,3-bis(diphenylphosphino)propane (dppp) was added as an optional ligand to the reaction medium. The resulting polyethylene product (4.7 g) had a molecular weight ($M_w$) of 370 and a molecular weight distribution ($M_w/M_n$) of 1.1 (determined by GPC relative to polystyrene standards), and a ratio ($\Re$) of methyl hydrogens centered around 0.85 ppm to total aliphatic hydrogens (by $^1$H NMR integration) of 0.57.

EXAMPLE 14

Pd(1,5-cyclooctadiene)(CH$_3$) (Cl)/AlCl$_3$ in CHCl$_3$

In a glove box, under an inert atmosphere (nitrogen), 20 mg (0.075 mmol) of palladium compound (Pd(1,5-cyclooctadiene) (CH$_3$) (Cl)) and 105 mg (0.75 mmol) AlCl$_3$ were added together with 10 ml of solvent (CHCl$_3$) in a glass autoclave liner. The glass liner was inserted into a stainless steel autoclave, and the autoclave was assembled in the glove box. The autoclave was heated to 55° C. and was charged to 800 psi with ethylene (single charge) to begin polymerization. The polymerization was allowed to continue for 16 hours. At the end of 16 hours, the polymerization was discontinued, and excess ethylene was vented. The resulting polymer solution was eluted through alumina to remove catalyst impurities, and vacuum distilled at 50° C. and 0.1 torr to yield 3.2 g of hyperbranched polyethylene as a clear viscous liquid. The polyethylene had a molecular weight (M$_w$) of 460 and a molecular weight distribution (M$_w$/M$_n$) of 1.1 (determined by GPC relative to polystyrene standards), and a ratio (ℜ) of methyl hydrogens centered around 0.85 ppm to total aliphatic hydrogens (by $^1$H NMR integration) of 0.61.

EXAMPLE 15

Pd(1,5-cyclooctadiene)(CH$_3$)(Cl)/dppp/AlCl$_3$ in CHCl$_3$

The procedure of Example 14 was repeated, except that 0.075 mmol of 1,3-bis(diphenylphosphino)propane (dppp) was added as an optional ligand to the reaction medium. The resulting polyethylene product (3.2 g) had a molecular weight (M$_w$) of 600 and a molecular weight distribution (M$_w$/M$_n$) of 1.2 (determined by GPC relative to polystyrene standards), and a ratio (ℜ) of methyl hydrogens centered around 0.85 ppm to total aliphatic hydrogens (by $^1$H NMR integration) of 0.55.

EXAMPLE 16

Pd(1,5-cyclooctadiene)(CH$_3$)(Cl)/PPh$_3$/AlCl$_3$ in CHCl$_3$

The procedure of Example 14 was repeated, except that 0.15 mmol of tri(phenyl)phosphine (PPh$_3$) was added as an optional ligand to the reaction medium. The resulting poly(ethylene) product (3.4 g) had a molecular weight (M$_w$) of 520 and a molecular weight distribution (M$_w$/M$_n$) of 1.1 (determined by GPC relative to polystyrene standards), and a ratio (ℜ) of methyl hydrogens centered around 0.85 ppm to total aliphatic hydrogens (by $^1$H NMR integration) of 0.58.

EXAMPLE 17

Pd(1,5-cyclooctadiene)(CH$_3$)(Cl)/Al(CH$_2$CH$_3$)$_3$ in CHCl$_3$

The procedure of Example 14 was repeated, except that an equivalent molar amount of triethyl aluminum was used in place of aluminum trichloride as the Lewis acid component of the catalyst. The resulting polyethylene product (1.0 g) had a molecular weight (M$_w$) of 410 and a molecular weight distribution (M$_w$/M$_n$) of 1.1 (determined by GPC relative to polystyrene standards) and a ratio (ℜ) of methyl hydrogens centered around 0.85 ppm to total aliphatic hydrogens (by $^1$H NMR integration) of 0.62.

EXAMPLE 18

Pd(1,5-cyclooctadiene)(CH$_3$)(Cl)/dppp/Al(CH$_2$CH$_3$)$_3$ in CHCl$_3$

The procedure of Example 17 was repeated, except that 0.075 mmol of 1,3-bis(diphenylphosphino)propane (dppp) was added as an optional ligand to the reaction medium. The resulting polyethylene product (2.2 g) had a molecular weight (M$_w$) of 550 and a molecular weight distribution (M$_w$/M$_n$) of 1.1 (determined by GPC relative to polystyrene standards), and a ratio (ℜ) of methyl hydrogens centered around 0.85 ppm to total aliphatic hydrogens (by $^1$H NMR integration) of 0.60.

EXAMPLE 19

Pd(1,5-cyclooctadiene)(CH$_3$)(Cl)/PPh$_3$/Al(CH$_2$CH$_3$)$_3$

The procedure of Example 18 was repeated, tri(phenyl)phosphine (PPh$_3$) was added as an optional ligand to the reaction medium, instead of the 1,3-bis(diphenylphosphino)propane (dppp). The resulting polyethylene product (2.4 g) had a molecular weight (M$_w$) of 580 and a molecular weight distribution (M$_w$/M$_n$) of 1.1 (determined by GPC relative to polystyrene standards), and a ratio (ℜ) of methyl hydrogens centered around 0.85 ppm to total aliphatic hydrogens (by $^1$H NMR integration) of 0.64.

EXAMPLE 20

[Ni(π-methallyl) (Br)]$_2$/Al(CH$_3$)$_3$ in CHCl$_3$

In a glove box, under an inert atmosphere (nitrogen), 10 mg (0.026 mmol) of nickel compound ([Ni (π-methallyl)(Br)]$_2$) was dissolved in 10 ml of solvent (CHCl$_3$) in a glass autoclave liner. Then, 40 mg (0.55 mmol) of Al(CH$_3$)$_3$ was added. The glass liner was inserted into a stainless steel autoclave, and the autoclave was assembled in the glove box. The autoclave was charged to 800 psi with ethylene (single charge) to begin polymerization. The polymerization was allowed to continue for 15 hours at 50° C. At the end of 15 hours, the polymerization was discontinued, and excess ethylene was vented. The resulting polymer solution was filtered and eluted through silica to remove catalyst impurities, and vacuum distilled at room temperature and 0.1 torr to yield 0.78 g of hyperbranched polyethylene as a clear viscous liquid. The resulting polyethylene a ratio (ℜ) of methyl hydrogens centered around 0.85 ppm to total aliphatic hydrogens (by $^1$H NMR integration) of 0.52.

EXAMPLE 21

[Ni(π-methallyl)(Br)]$_2$/(C$_2$H$_5$)$_2$AlCl.(C$_2$H$_5$)AlCl$_2$ in CHCl$_3$

In a glove box, under an inert atmosphere (nitrogen), 5 mg (0.013 mmol) of nickel compound ([Ni(π-methallyl)(Br)]$_2$) was dissolved in 5 ml of solvent (CHCl$_3$) in a glass autoclave liner. Then, a solution of 36 mg (0.15 mmol) of (C$_2$H$_5$)$_2$AlCl.(C$_2$H$_5$)AlCl$_2$ in 5 ml of CHCl$_3$ was added. The glass liner was inserted into a stainless steel autoclave, and the autoclave was assembled in the glove box. The autoclave was charged to 800 psi with ethylene (single charge) to begin polymerization. The polymerization was allowed to continue for 3.5 hours at 50° C. At the end of 3.5 hours, the polymerization was discontinued, and excess ethylene was vented. The resulting polymer solution was eluted through silica to remove catalyst impurities, and vacuum distilled at room temperature and 0.1 torr to yield 1.39 g of hyperbranched polyethylene as a clear viscous liquid. The resulting polyethylene a ratio ($\Re$)of methyl hydrogens centered around 0.85 ppm to total aliphatic hydrogens (by $^1$H NMR integration) of 0.54.

EXAMPLE 22

[Ni($\pi$-methallyl)(Br)]$_2$/(C$_2$H$_5$)$_2$AlCl in C$_6$H$_5$Cl

In a glove box, under an inert atmosphere (nitrogen), 5 mg (0.013 mmol) of nickel compound ([Ni($\pi$-methallyl)(Br)]$_2$) was dissolved in 10 ml of solvent (C$_6$H$_5$Cl) in a glass autoclave liner. Then, a (C$_2$H$_5$)$_2$AlCl solution (0.26 ml of 1 M solution in hexane, 0.26 mmol) was added. The glass liner was inserted into a stainless steel autoclave, and the autoclave was assembled in the glove box. The autoclave was charged to 800 psi with ethylene (single charge) to begin polymerization. The polymerization was allowed to continue for 23 hours at 50° C. At the end of 23 hours, the polymerization was discontinued, and excess ethylene was vented. The resulting polymer solution was eluted through silica to remove catalyst impurities, and the volatiles were removed at room temperature and 0.1 torr to yield 33 mg of hyperbranched polyethylene as a clear viscous liquid.

EXAMPLE 23

[Ni($\pi$-methallyl)(Br)]$_2$/(C$_2$H$_5$)$_2$AlCl in CHCl$_3$

The procedure of Example 22 was followed, except that CHCl$_3$ was used as the solvent. The resulting polyethylene (2.61 g) had a degree of branching of 0.60.

EXAMPLE 24

[Ni($\pi$-methallyl)(Br)]$_2$/(C$_2$H$_5$)AlCl$_2$ in C$_6$H$_5$Cl

In a glove box, under an inert atmosphere (nitrogen), 5 mg (0.013 mmol) of nickel compound ([Ni($\pi$-methallyl)(Br)]$_2$) was dissolved in 10 ml of solvent (C$_6$H$_5$Cl) in a glass autoclave liner. Then, a (C$_2$H$_5$)AlCl$_2$ solution (0.26 ml of 1 M solution in hexane, 0.26 mmol) was added. The glass liner was inserted into a stainless steel autoclave, and the autoclave was assembled in the glove box. The autoclave was charged to 800 psi with ethylene (single charge) to begin polymerization. The polymerization was allowed to continue for 1.5 hours at 50° C. At the end of 1.5 hours, the polymerization was discontinued, and excess ethylene was vented. The resulting polymer solution was eluted through silica to remove catalyst impurities, and the volatiles were removed at room temperature and 0.1 torr to yield 0.76 g of hyperbranched polyethylene as a clear viscous liquid. The resulting polyethylene had a degree of branching of 0.42.

EXAMPLE 25

[Ni($\pi$-methallyl)(Br)]$_2$/(C$_2$H$_5$)AlCl$_2$ in CHCl$_3$

The procedure of Example 24 was followed, except that CHCl$_3$ was used as the solvent. The resulting polyethylene (1.75 g) had a degree of branching of 0.53.

EXAMPLE 26

Co(acetylacetonate)$_3$/AlCl$_3$ in C$_6$H$_5$Cl

In a glove box, under an inert atmosphere (nitrogen), 10 mg (0.028 mmol) of cobalt compound (Co(acetylacetonate)$_3$) and 37 mg AlCl$_3$ were added to 10 ml of C$_6$H$_5$Cl in a glass autoclave liner. The glass liner was inserted into a stainless steel autoclave, and the autoclave was assembled in the glove box. The autoclave was charged to 800 psi with ethylene (single charge) to begin polymerization. The polymerization was allowed to continue for 17 hours at 50° C. At the end of 17 hours, the polymerization was discontinued, and excess ethylene was vented. The resulting polymer solution was eluted through silica to remove catalyst impurities, and the volatiles were removed at room temperature and 0.1 torr to yield 0.93 g of hyperbranched polyethylene as a clear viscous liquid. The resulting polyethylene had a degree of branching of 0.48.

EXAMPLE 27

(1,5-cyclooctadiene)$_2$ Ni/AlCl$_3$ in CHCl$_3$

In a glove box, under an inert atmosphere (nitrogen), 5 mg (0.018 mmol) of nickel compound ((1,5-cyclooctadiene)$_2$ Ni) and 24 mg AlCl$_3$ (0.18 mmol) were added to 10 ml of CHCl$_3$ in a glass autoclave liner. The glass liner was inserted into a stainless steel autoclave, and the autoclave was assembled in the glove box. The autoclave was charged to 800 psi with ethylene (single charge) to begin polymerization. The polymerization was allowed to continue for 23 hours at 50° C. At the end of 23 hours, the polymerization was discontinued, and excess ethylene was vented. The resulting polymer solution was eluted through silica to remove catalyst impurities, and the volatiles were removed at room temperature and 0.1 torr to yield 3.02 g of hyperbranched polyethylene as a clear viscous liquid. The resulting polyethylene had a degree of branching of 0.52.

EXAMPLE 28

Co(acetylacetonate)$_3$/Al(C$_2$H$_5$)$_3$ in CHCl$_3$

In a glove box, under an inert atmosphere (nitrogen), 10 mg (0.028 mmol) of cobalt compound (Co(acetylacetonate)$_3$) was dissolved in 10 ml of CHCl$_3$ in a glass autoclave liner. Then 38 mg (0.33 mmol) of Al(C$_2$H$_5$)$_3$ was added. The glass liner was inserted into a stainless steel autoclave, and the autoclave was assembled in the glove box. The autoclave was charged to 800 psi with ethylene (single charge) to begin polymerization. The polymerization was allowed to continue for 16.5 hours at 50° C. At the end of 16.5 hours, the polymerization was discontinued, and excess ethylene was vented. The resulting polymer solution was eluted through silica to remove catalyst impurities, and the volatiles were removed at room temperature and 0.1 torr to yield 1.07 g of hyperbranched polyethylene as a clear viscous liquid. The resulting polyethylene had a degree of branching of 0.56.

EXAMPLE 29

[Ni($\pi$-methallyl)(Br)]$_2$/$^t$BuP$_3$/(C$_2$H$_5$)$_2$AlCl.(C$_2$H$_5$)AlCl$_2$ in CHCl$_3$ In a glove box, under an inert atmosphere (nitrogen), 10 mg (0.026 mmol) of nickel compound ([Ni($\pi$-methallyl)(Br)]$_2$) and 42 mg (0.21 mmol) of tri-t-butylphosphine ($^t$Bu$_3$P) were dissolved in 10 ml of solvent (CHCl$_3$) in a glass autoclave liner. Then, 66 mg (0.27 mmol) of (C$_2$H$_5$)$_2$AlCl.(C$_2$H$_5$)AlCl$_2$ was added. The glass liner was inserted into a stainless steel autoclave, and the autoclave was assembled in the glove box. The autoclave was connected to a constant feed of ethylene at 100 psi, to begin polymerization. The polymerization was allowed to continue for 24 hours at room temperature. At the end of 24 hours, the polymerization was discontinued, and excess ethylene was vented. The resulting polymer solution was filtered and eluted through silica to remove catalyst impurities, and the volatiles were removed at room temperature and 0.1 torr to yield 0.83 g of hyperbranched polyethylene as a clear viscous liquid. The resulting polyethylene a ratio ($\Re$)of methyl hydrogens centered around 0.85 ppm to total aliphatic hydrogens (by $^1$H NMR integration) of 0.56.

EXAMPLE 30

[Ni($\pi$-methallyl)(Br)]$_2$/AlCl$_3$ in hexane

In a glove box, under an inert atmosphere (nitrogen), 5 mg (0.013 mmol) of nickel compound ([Ni($\pi$-methallyl)(Br)]$_2$) and 35 mg AlCl$_3$ (0.26 mmol) were added to 10 ml of hexane in a glass autoclave liner. The glass liner was inserted into a stainless steel autoclave, and the autoclave was assembled in the glove box. The autoclave was charged with a constant feed of ethylene at 800 psi to begin polymerization. The polymerization was allowed to continue for 30 minutes at room temperature. At the end of 30 minutes, polymerization was discontinued, and excess ethylene was vented. The resulting polymer solution was filtered, and the volatiles were removed at room temperature and 0.1 torr to yield 2.76 g of hyperbranched polyethylene as a clear viscous liquid. The resulting polyethylene had a degree of branching of 0.47.

EXAMPLE 31

Mn(acetylacetonate)$_2$/Al(C$_2$H$_5$)$_3$ in CHCl$_3$

In a glove box, under an inert atmosphere (nitrogen), 10 mg (0.040 mmol) of manganese compound (Mn(acetylacetonate)$_2$) was dissolved in 10 ml of CHCl$_3$ in a glass autoclave liner. Then 60 mg (0.53 mmol) Al(C$_2$H$_5$)$_3$ was added. The glass liner was inserted into a stainless steel autoclave, and the autoclave was assembled in the glove box. The autoclave was charged to 800 psi with ethylene (single charge) to begin polymerization. The polymerization was allowed to continue for 19.5 hours at room temperature. At the end of 19.5 hours, the polymerization was discontinued, and excess ethylene was vented. The resulting polymer solution was filtered to remove catalyst impurities, and the volatiles were removed at room temperature and 0.1 torr to yield 0.50 g of hyperbranched polyethylene as a clear viscous liquid. The resulting polyethylene had a degree of branching of 0.45.

EXAMPLE 32

[Ni($\pi$-methallyl)(Br)]$_2$/(C$_2$H$_5$)AlCl$_2$ in hexane

In a glove box, under an inert atmosphere (nitrogen), 5 mg (0.013 mmol) of nickel compound ([Ni($\pi$-methallyl)(Br)]$_2$) was dissolved in 10 ml hexane in a glass autoclave liner. A (C$_2$H$_5$)AlCl$_2$ solution (0.26 ml of 1 M solution in hexane; 0.26 mmol) was added. The glass liner was inserted into a stainless steel autoclave, and the autoclave was assembled in the glove box. The autoclave was charged to 800 psi with ethylene (single charge) to begin polymerization. The polymerization was allowed to continue for 40 minutes at 50° C. At the end of 40 minutes, the polymerization was discontinued, and excess ethylene was vented. The resulting polymer solution was eluted through alumina to remove catalyst impurities, and the volatiles were removed at room temperature and 0.1 torr to yield 0.29 g of hyperbranched polyethylene as a clear viscous liquid. The resulting polyethylene had a degree of branching of 0.50.

EXAMPLE 33

[Ni($\pi$methallyl)(Br)]$_2$/(C$_2$H$_5$)$_2$AlCl in hexane

In a glove box, under an inert atmosphere (nitrogen), 5 mg (0.013 mmol) of nickel compound ([Ni($\pi$-methallyl)(Br)]$_2$) was dissolved in 10 ml hexane in a glass autoclave liner. A (C$_2$H$_5$)$_2$AlCl solution (0.26 ml of 1 M solution in hexane; 0.26 mmol) was added. The glass liner was inserted into a stainless steel autoclave, and the autoclave was assembled in the glove box. The autoclave was charged to 800 psi with ethylene (single charge) to begin polymerization. The polymerization was allowed to continue for 15.5 hours at 50° C. At the end of 15.5 hours, the polymerization was discontinued, and excess ethylene was vented. The resulting polymer solution was eluted through alumina to remove catalyst impurities, and the volatiles were removed at room temperature and 0.1 torr to yield 7 mg of hyperbranched polyethylene as a clear viscous liquid.

EXAMPLE 34

[Ni($\pi$-methallyl)(Br)]$_2$/(C$_2$H$_5$)$_2$AlCl.(C$_2$H$_5$)AlCl$_2$ in hexane In a glove box, under an inert atmosphere (nitrogen), 5 mg (0.013 mmol) of nickel compound ([Ni($\pi$-methallyl)(Br)]$_2$) and 45 mg (0.18 mmol) of (C$_2$H$_5$)$_2$AlCl.(C$_2$H$_5$)AlCl$_2$ were dissolved in 10 ml hexane in a glass autoclave liner. The glass liner was inserted into a stainless steel autoclave, and the autoclave was assembled in the glove box. The autoclave was charged to 800 psi with ethylene (single charge) to begin polymerization. The polymerization was allowed to continue for 15.5 hours at 50° C. At the end of 15.5 hours, the polymerization was discontinued, and excess ethylene was vented. The resulting polymer solution was eluted through alumina to remove catalyst impurities, and the volatiles were removed at room temperature and 0.1 torr to yield 23 mg of hyperbranched polyethylene as a clear viscous liquid. The resulting polyethylene had a degree of branching of 0.43.

EXAMPLE 35

[Ni($\pi$-methallyl)(Br)]$_2$/dppe/AlCl$_3$ in no solvent

In a glove box, under an inert atmosphere (nitrogen), 5 mg (0.013 mmol) of nickel compound ([Ni($\pi$-methallyl)(Br)]$_2$) and 10 mg (0.025 mmol) of 1,2-bis(diphenylphosphine) ethane (dppe) were dissolved in 10 ml CH$_2$Cl$_2$ in a pear-shaped flask. Then 35 mg (0.26 mmol) AlCl$_3$ was added and dissolved over 4 hours at room temperature. The volatiles were then removed at room temperature and 0.1 torr. In a glove box, the flask was inserted into a stainless steel autoclave, and the autoclave was assembled in the glove box. The autoclave was charged to 800 psi with ethylene (single charge) to begin polymerization. The polymerization was allowed to continue for 24 hours at room temperature. At the end of 24 hours, the polymerization was discontinued, and excess ethylene was vented. The resulting polymer solution was filtered, and the volatiles were removed at room temperature and 0.1 torr to yield 0.5 g of hyperbranched polyethylene as a clear viscous liquid. The resulting polyethylene had a degree of branching of 0.45.

EXAMPLE 36

[(1,5-cyclooctadiene)Rh(Cl)$_2$/$^t$BuP$_3$/AlCl$_3$ in CHCl$_3$

In a glove box, under an inert atmosphere (nitrogen), 10 mg (0.02 mmol) of rhodium compound ([(1,5- cyclooctadiene) Rh(Cl)$_2$) was dissolved in 5 ml CHCl$_3$ in a glass autoclave liner. A solution of 34 mg (0.17 mmol) of tri-t-butylphosphine ($^t$BuP$_3$) in 5 ml of solvent (CHCl$_3$) was added. Then, 53 mg (0.40 mmol) of AlCl$_3$ was added. The glass liner was inserted into a stainless steel autoclave, and the autoclave was assembled in the glove box. The autoclave was charged to 800 psi with ethylene (single charge) to begin polymerization. The polymerization was allowed to continue for 17.5 hours at 50° C. At the end of 17.5 hours, the polymerization was discontinued, and excess ethylene was vented. The resulting polymer solution was eluted through alumina to remove catalyst impurities, and the volatiles were removed at 120° C. and 0.1 torr to yield 1.13 g of hyperbranched polyethylene as a clear viscous liquid. The resulting polyethylene a ratio ($\mathcal{R}$)of methyl hydrogens centered around 0.85 ppm to total aliphatic hydrogens (by $^1$H-NMR integration) of 0.51.

EXAMPLE 37

[Ni(π-methallyl)(Br)]$_2$/$^i$Pr$_3$P/AlCl$_3$ in C$_6$H$_5$Cl

In a glove box, under an inert atmosphere (nitrogen), 5 mg (0.013 mmol) of nickel compound ([Ni(π-methallyl)(Br)]$_2$) and 10 mg (0.062 mmol) of triisopropylphosphine ($^i$Pr$_3$P) were dissolved in 10 ml of C$_6$H$_5$Cl in a glass autoclave liner. The 35 mg (0.26 mmol) of AlCl$_3$ was added. The glass liner was inserted into a stainless steel autoclave, and the autoclave was assembled in the glove box. The autoclave was connected to a constant feed of ethylene at 700 psi to begin polymerization. The polymerization was allowed to continue for 30 minutes at room temperature. At the end of 30 minutes, the polymerization was discontinued, and excess ethylene was vented. The resulting polymer solution was eluted through alumina to remove catalyst impurities, and the volatiles were removed at room temperature and 0.1 torr to yield 0.84 g of hyperbranched polyethylene as a clear viscous liquid.

EXAMPLE 38

[Ni(π-methallyl)(Br)]$_2$/$^t$BU$_3$P/AlCl$_3$ in C$_6$H$_{12}$

In a glove box, under an inert atmosphere (nitrogen), 5 mg (0.013 mmol) of nickel compound ([Ni(π-methallyl)(Br)]$_2$) and 11 mg (0.054 mmol) of tri-t-butylphosphine ($^t$Bu$_3$P) were dissolved in 10 ml of cyclohexane (C$_6$H$_{12}$)in a glass autoclave liner. Then 35 mg (0.26 mmol) of AlCl$_3$ was added. The glass liner was inserted into a stainless steel autoclave, and the autoclave was assembled in the glove box. The autoclave was connected to a constant feed of ethylene at 800 psi to begin polymerization. The polymerization was allowed to continue for 30 minutes at room temperature. At the end of 30 minutes, the polymerization was discontinued, and excess ethylene was vented. The resulting polymer solution was added with stirring to methanol, then filtered. The filtrate volatiles were removed at 120° C. and 0.1 torr to yield 0.98 g of hyperbranched polyethylene as a clear viscous liquid. The resulting polyethylene had a molecular weight (M$_w$) of 670 and a degree of branching of 0.47.

EXAMPLE 39

[(1,5-cyclooctadiene)Rh(Cl)]$_2$/dppe/AlCl$_3$ in CHCl$_3$

In a glove box, under an inert atmosphere (nitrogen), 10 mg (0.020 mmol) of rhodium compound ([(1,5-cyclooctadiene)Rh(Cl)]$_2$) and 17 mg (0.04 mmol) of 1,2-bis-(diphenylphosphino)ethane (dppe) were dissolved in 10 ml of CHCl$_3$ in a glass autoclave liner. Then 53 mg (0.40 mmol) of AlCl$_3$ was added. The glass liner was inserted into a stainless steel autoclave, and the autoclave was assembled in the glove box. The autoclave was charged to 800 psi with ethylene (single charge) to begin polymerization. The polymerization was allowed to continue for 17 hours at 50° C. At the end of 17 hours, the polymerization was discontinued, and excess ethylene was vented. The resulting polymer solution was eluted through silica to remove catalyst impurities, and the volatiles were removed at 120° C. and 0.1 torr to yield 0.93 g of hyperbranched polyethylene as a clear viscous liquid. The resulting polyethylene had a molecular weight (M$_w$) of 1100 and a degree of branching of 0.47.

EXAMPLE 40

[Ni(π-methallyl)(Br)]$_2$/PCy$_3$/AlCl$_3$ in C$_6$H$_5$Cl

In a glove box, under an inert atmosphere (nitrogen), 5 mg (0.013 mmol) of nickel compound ([Ni(π-methallyl)(Br)]$_2$) and 33 mg (0.12 mmol) of tricyclohexylphosphine (PCy$_3$) were dissolved in 10 ml of C$_6$H$_5$Cl n a glass autoclave liner. Then 35 mg (0.26 mmol) of AlCl$_3$ was added. The glass liner was inserted into a stainless steel autoclave, and the autoclave was assembled in the glove box. The autoclave was connected to a constant feed of ethylene at 800 psi to begin polymerization. The polymerization was allowed to continue for 30 minutes at room temperature. At the end of 30 minutes, the polymerization was discontinued, and excess ethylene was vented. The resulting polymer solution was eluted through alumina to remove catalyst impurities, and the volatiles were removed at room temperature and 0.1 torr to yield 1.22 g of hyperbranched polyethylene as a clear viscous liquid. The resulting polyethylene had a degree of branching of 0.49.

EXAMPLES 41–42

-olefins using (1,5-Cyclooctadiene) Pd(CH$_3$)(Cl)/dppp/AlCl$_3$ in CHCl$_3$

In a glove box, under an inert atmosphere (nitrogen), 20 mg (0.075 mmol) of palladium compound (1,5-cyclooctadiene Pd(CH$_3$) (Cl)) and 32 mg (0.076 mmol) of 1,2-bis(diphenyl-phosphino)propane (dppp) were dissolved in 5 ml of CHCl$_3$. The solution was added to a glass autoclave liner containing 100 mg AlCl$_3$ dissolved in an additional 5 ml CHCl$_3$. The glass liner was inserted into a stainless steel autoclave, and the autoclave was assembled in the glove box. The autoclave was charged with 5 g of the olefin noted in Table 1 to begin polymerization. The polymerization was allowed to continue for 16 hours at 50° C. At the end of 16 hours, the polymerization was discontinued, and excess monomer was vented. The resulting polymer solution was eluted through alumina to remove catalyst impurities, and the volatiles were removed at 50° C. and 0.1 torr to yield hyperbranched polymer as a clear viscous liquid. The yield, molecular weight (M$_w$), and branching for the polyolefins are given in Table 1.

TABLE 1

| Example No. | Olefin | Yield (g) | M$_w$ | Branching |
|---|---|---|---|---|
| 41 | propylene | 3.5 | 680 | 0.54 |
| 42 | 1-butene | 3.4 | 1000 | 0.45 |

EXAMPLE 43

1-butene using (1,5-cycloocatdiene) Pd(CH$_3$) (Cl)/dppp/Al(C$_2$H$_5$)$_3$ in CHCl$_3$ In a glove box, under an inert atmosphere (nitrogen), 20 mg (0.075 mmol) of palladium compound (1,5- cyclooctadiene Pd(CH$_3$) (Cl)) and 32 mg (0.076 mmol) of 1,2-bis(diphenyl-phosphino)propane (dppp) were dissolved in 5 ml of CHCl$_3$. The solution was added to a glass autoclave liner containing 100 mg Al(C$_2$H$_5$)$_3$ dissolved in an additional 5 ml CHCl$_3$. The glass liner was inserted into a stainless steel autoclave, and the autoclave was assembled in the glove box. The autoclave was charged with 5 g of 1-butene to begin polymerization. The polymerization was allowed to continue for 16 hours at 50° C. At the end of 16 hours, the polymerization was discontinued, and excess monomer was vented. The resulting polymer solution was eluted through alumina to remove catalyst impurities, and the volatiles were removed at 50° C. and 0.1 torr to yield 4.4 g of hyperbranched poly(1-butene) as a clear viscous liquid. The hyperbranched poly(1-butene) had a molecular weight (M$_w$) of 340, and a branching ratio of 0.58.

It will be appreciated that the instant specification and claims are set forth by way of illustration and not limitation, and that various modifications and changes may be made without departing from the spirit and scope of the invention.

What is claimed is:

1. A method of synthesizing polymers from ethylene, which comprises: contacting under polymerization conditions and optionally, in the presence of a halogenated solvent (a) ethylene and (b) a catalyst system consisting essentially of (i) a transition metal component, (ii) an excess of a Lewis acid component having the formula AlX$_x$R$_{3-x}$, where X is a halogen, R is a lower alkyl and x is 0 to 3, and, optionally, (iii) a nitrogen, oxygen, phosphorus or mixed nitrogen and/or oxygen and/or phosphorus based monodentate, bidentate or tridentate ligand, so as to form branched ethylene polymers that are liquid, viscous oils at about room temperature, said polymers having a molecular weight in excess of about 300 and having a ratio ℜ of methyl hydrogens centered around 0.85 ppm in the $^1$H-NMR spectra of the polymers relative to the total aliphatic hydrogens in the polymers of at least about 0.40, wherein the transition metal component is selected from the group consisting of {(π-(meth)allyl)Ni(Br)}$_2$, (1,5-cyclooctadiene)Pd(CH$_3$)(Cl), {Ni((meth)allyl)(trifluoroacetate)}$_2$, Ni(1,5-cyclooctadiene)$_2$, PdCl$_2$, Pd(1,5-cyclooctadiene)Cl$_2$, Co(acetylacetonate)$_3$, Mn(acetylacetonate)$_2$, {(1,5-cyclooctadiene)Rh(Cl)}$_2$, complexes of Ni that consist of Ni and at least one moiety selected from the group consisting of alkyl, aryl and halide moieties, complexes of Pd that consist of Pd and at least one moiety selected from the group consisting of alkyl, aryl and halide moieties, and mixtures thereof.

2. A method of synthesizing polymers from propylene, which comprises: contacting under polymerization conditions and optionally, in the presence of a halogenated solvent (a) propylene and (b) a catalyst system consisting essentially of (i) a transition metal component, (ii) an excess of a Lewis acid component having the formula AlX$_x$R$_{3-x}$, where X is a halogen, R is a lower alkyl and x is 0 to 3, and, optionally, (iii) a nitrogen, oxygen, phosphorus or mixed nitrogen and/or oxygen and/or phosphorus based monodentate, bidentate or tridentate ligand, so as to form branched propylene polymers that are liquid, viscous oils at about room temperature, said polymers having a molecular weight in excess of about 300 and having a ratio ℜ of methyl hydrogens centered around 0.85 ppm in the $^1$H-NMR spectra of the polymers relative to the total aliphatic hydrogens in the polymers of greater than 0.50; said Lewis acid component being present during the propylene polymer synthesis in an amount of from about 2 to 50 moles per mole of transition metal component, wherein the transition metal component is selected from the group consisting of {(π-(meth)allyl)Ni(Br)}$_2$, (1,5-cyclooctadiene)Pd(CH$_3$)(Cl), {Ni((meth)allyl)(trifluoroacetate)}$_2$, Ni(1,5-cyclooctadiene)$_2$, PdCl$_2$, Pd(1,5-cyclooctadiene)Cl$_2$, Co(acetylacetonate)$_3$, Mn(acetylacetonate)$_2$, {(1,5-cyclooctadiene)Rh(Cl)}$_2$, complexes of Ni that consist of Ni and at least one moiety selected from the group consisting of alkyl, aryl and halide moieties, complexes of Pd that consist of Pd and at least one moiety selected from the group consisting of alkyl, aryl and halide moieties, and mixtures thereof.

3. A method of synthesizing polymers from butene, which comprises: contacting under polymerization conditions and optionally, in the presence of a halogenated solvent (a) butene and (b) a catalyst system consisting essentially of (i) a transition metal component, (ii) an excess of a Lewis acid component having the formula AlX$_x$R$_{3-x}$, where X is a halogen, R is a lower alkyl and x is 0 to 3, and, optionally, (iii) a nitrogen, oxygen, phosphorus or mixed nitrogen and/or oxygen and/or phosphorus based monodentate, bidentate or tridentate ligand, so as to form branched butene polymers that are liquid, viscous oils at about room temperature, said polymers having a molecular weight in excess of about 300 and having a ratio ℜ of methyl hydrogens centered around 0.85 ppm in the $^1$H-NMR spectra of the polymers relative to the total aliphatic hydrogens in the polymers of at least about 0.40, wherein the transition metal component is selected from the group consisting of {(π-(meth)allyl)Ni(Br)}$_2$, (1,5-cyclooctadiene)Pd(CH$_3$)(Cl), {Ni((meth)allyl)(trifluoroacetate)}$_2$, Ni(1,5-cyclooctadiene)$_2$, PdCl$_2$, Pd(1,5-cyclooctadiene)Cl$_2$, Co(acetylacetonate)$_3$, Mn(acetylacetonate)$_2$, {(1,5-cyclooctadiene)Rh(Cl)}$_2$, complexes of Ni that consist of Ni and at least one moiety selected from the group consisting of alkyl, aryl and halide moieties, complexes of Pd that consist of Pd and at least one moiety selected from the group consisting of alkyl, aryl and halide moieties, and mixtures thereof.

4. A method of synthesizing polymers from C$_5$–C$_{24}$ -olefins, which comprises: contacting under polymerization conditions and optionally, in the presence of a halogenated solvent (a) at least one C$_5$–C$_{24}$ -olefin and (b) a catalyst system consisting essentially of (i) a transition metal component, (ii) an excess of a Lewis acid component having the formula AlX$_x$R$_{3-x}$, where X is a halogen, R is a lower alkyl and x is 0 to 3, and, optionally, (iii) a nitrogen, oxygen, phosphorus or mixed nitrogen and/or oxygen and/or phosphorus based monodentate, bidentate or tridentate ligand, so as to form branched polymers that are liquid, viscous oils at about room temperature, said polymers having a molecular weight in excess of about 300, wherein the transition metal component is selected from the group consisting of {(π-(meth)allyl)Ni(Br)}$_2$, (1,5-cyclooctadiene) Pd(CH$_3$)(Cl), {Ni((meth)allyl)(trifluoroacetate)}$_2$, Ni(1,5-cyloocta- diene)$_2$, PdCl$_2$, Pd(1,5-cyclooctadiene)Cl$_2$, Co(acetylacetonate)$_3$, Mn(acetylacetonate)$_2$, {(1,5-cyclooctadiene)Rh(Cl)}$_2$, complexes of Ni that consist of Ni and at least one moiety selected from the group consisting of alkyl, aryl and halide moieties, complexes of Pd that consist of Pd and at least one moiety selected from the group consisting of alkyl, aryl and halide moieties, and mixtures thereof.

5. A method of synthesizing polymers from ethylene, which comprises: contacting under polymerization conditions and optionally, in the presence of a halogenated solvent (a) ethylene and (b) a catalyst system consisting essentially of (i) a transition metal component, (ii) an excess of a Lewis acid component having the formula AlX$_x$R$_{3-x}$, where X is a halogen, R is a lower alkyl and x is 0 to 3, and (iii) a nitrogen, oxygen, phosphorus or mixed nitrogen and/or oxygen and/or phosphorus based monodentate, bidentate or tridentate ligand, so as to form branched ethylene polymers that are liquid, viscous oils at about room temperature, said polymers having a molecular weight in excess of about 300 and having a ratio ℜ of methyl hydrogens centered around 0.85 ppm in the $^1$H-NMR spectra of the polymers relative to the total aliphatic hydrogens in the polymers of at least about 0.40, wherein the transition metal component is selected from the group consisting of {($\pi$-(meth)allyl)Ni(Br)}$_2$, (1,5-cyclooctadiene)Pd(CH$_3$)(Cl), {Ni((meth)allyl)(trifluoroacetate)}$_2$, Ni(1,5-cyclooctadiene)$_2$, PdCl$_2$, Pd(1,5-cyclooctadiene)Cl$_2$, Co(acetylacetonate)$_3$, Mn(acetylacetonate)$_2$, {(1,5-cyclooctadiene)Rh(Cl)}$_2$, complexes of Ni that consist of Ni and at least one moiety selected from the group consisting of alkyl, aryl and halide moieties, complexes of Pd that consist of Pd and at least one moiety selected from the group consisting of alkyl, aryl and halide moieties, and mixtures thereof.

6. The method of claim 5 wherein said ligand is selected from the group consisting of tri(cyclohexyl) phosphine, tri(tert-butyl)phosphine, tri(isopropyl) phosphine, tri(phenyl)phosphine, pyridine, 1,3-bis(diphenylphosphino) propane, 1,2-bis(diphenylphosphino) ethane, 2,2'-dipyridyl, 1,3-bis(diisopropylphosphino) propane, bis(2-diphenylphosphinoethyl)phenylphosphine, and 1,8-diazabicyclo[5.4.0]undec-7-ene.

7. A method of synthesizing polymers from propylene, which comprises: contacting under polymerization conditions and optionally, in the presence of a halogenated solvent (a) propylene and (b) a catalyst system consisting essentially of (i) a transition metal component, (ii) an excess of a Lewis acid component having the formula AlX$_x$R$_{3-x}$, where X is a halogen, R is a lower alkyl and x is 0 to 3, and (iii) a nitrogen, oxygen, phosphorus or mixed nitrogen and/or oxygen and/or phosphorus based monodentate, bidentate or tridentate ligand, so as to form branched propylene polymers that are liquids viscous oils at about room temperature, said polymers having a molecular weight in excess of about 300 and having a ratio ℜ of methyl hydrogens centered around 0.85 ppm in the $^1$H-NMR spectra of the polymers relative to the total aliphatic hydrogens in the polymers of greater than 0.50, wherein the transition metal component is selected from the group consisting of {($\pi$-(meth)allyl)Ni(Br)}$_2$, (1,5-cyclooctadiene)Pd(CH$_3$)(Cl), {Ni((meth)allyl)(trifluoroacetate)}$_2$, Ni(1,5 -cyclooctadiene)$_2$, PdCl$_2$, Pd(1,5-cyclooctadiene)Cl$_2$, Co(acetylacetonate)$_3$, Mn(acetylacetonate)$_2$, {(1,5-cyclooctadiene)Rh(Cl)}$_2$, complexes of Ni that consist of Ni and at least one moiety selected from the group consisting of alkyl, aryl and halide moieties, complexes of Pd that consist of Pd and at least one moiety selected from the group consisting of alkyl, aryl and halide moieties, and mixtures thereof.

8. The method of claim 7, wherein said ligand is selected from the group consisting of tri(cyclohexyl) phosphine, tri(tert-butyl)phosphine, tri(isopropyl) phosphine, tri(phenyl)phosphine, pyridine, 1,3-bis(diphenyl-phosphino) propane, 1,2-bis(diphenylphosphino)ethane, 2,2'-dipyridyl, 1,3-bis(diisopropylphosphino)propane, bis(2-diphenylphosphinoethyl)phenylphosphine, and 1,8-diazabicyclo[5.4.0]undec-7-ene.

9. A method of synthesizing polymers from butene, which comprises: contacting under polymerization conditions and optionally, in the presence of a halogenated solvent (a) butene and (b) a catalyst system consisting essentially of (i) a transition metal component, (ii) an excess of a Lewis acid component having the formula AlX$_x$R$_{3-x}$, where X is a halogen, R is a lower alkyl and x is 0 to 3, and (iii) a nitrogen, oxygen, phosphorus or mixed nitrogen and/or oxygen and/or phosphorus based monodentate, bidentate or tridentate ligand, so as to form branched butene polymers that are liquid, viscous oils at about room temperature, said polymers having a molecular weight in excess of about 300 and having a ratio ℜ of methyl hydrogens centered around 0.85 ppm in the $^1$H-NMR spectra of the polymers relative to the total aliphatic hydrogens in the polymers of at least about 0.40, wherein the transition metal component is selected from the group consisting of {($\pi$-(meth)allyl)Ni(Br)}$_2$, (1,5-cyclooctadiene)Pd(CH$_3$)(Cl), {Ni((meth)allyl)(trifluoroacetate)}$_2$, Ni(1,5-cyclooctadiene)$_2$, PdCl$_2$, Pd(1,5-cyclooctadiene)Cl$_2$, Co(acetylacetonate)$_3$, Mn(acetylacetonate)$_2$, {(1,5-cyclooctadiene)Rh(Cl)}$_2$, complexes of Ni that consist of Ni and at least one moiety selected from the group consisting of alkyl, aryl and halide moieties, complexes of Pd that consist of Pd and at least one moiety selected from the group consisting of alkyl, aryl and halide moieties, and mixtures thereof.

10. The method of claim 9, wherein said ligand is selected from the group consisting of tri(cyclohexyl) phosphine, tri(tert-butyl)phosphine, tri(isopropyl) phosphine, tri(phenyl)phosphine, pyridine, 1,3-bis(diphenylphosphino) propane, 1,2-bis(diphenylphosphino) ethane, 2,2'-dipyridyl, 1,3-bis(diisopropylphosphino) propane, bis(2-diphenylphosphinoethyl)phenylphosphine, and 1,8-diazabicyclo[5.4.0]undec-7-ene.

11. A method of synthesizing polymers from $C_5$–$C_{24}$ -olefins, which comprises: contacting under polymerization conditions and optionally, in the presence of a halogenated solvent (a) at least one $C_5$–$C_{24}$ -olefin and (b) a catalyst system consisting essentially of (i) a transition metal component, (ii) an excess of a Lewis acid component having the formula AlX$_x$R$_{3x}$, where X is a halogen, R is a lower alkyl and x is 0 to 3, and (iii) a nitrogen, oxygen, phosphorus or mixed nitrogen and/or oxygen and/or phosphorus based monodentate, bidentate or tridentate ligand, so as to form branched polymers that are liquid, viscous oils at about room temperature, said polymers having a molecular weight in excess of about 300, wherein the transition metal component is selected from the group consisting of {($\pi$-(meth)allyl)Ni(Br)}$_2$, (1,5-cyclooctadiene)Pd(CH$_3$)(Cl), {Ni((meth)allyl)(trifluoroacetate)}$_2$, Ni(1,5-cyclooctadiene)$_2$, PdCl$_2$, Pd(1,5-cyclooctadiene)Cl$_2$, Co(acetylacetonate)$_3$, Mn(acetylacetonate)$_2$, {(1,5-cyclooctadiene)Rh(Cl)}$_2$, complexes of Ni that consist of Ni and at least one moiety selected from the group consisting of alkyl, aryl and halide moieties, complexes of Pd that consist of Pd and at least one moiety selected from the group consisting of alkyl, aryl and halide moieties, and mixtures thereof.

12. The method of claim 11, wherein said ligand is selected from the group consisting of tri(cyclohexyl) phosphine, tri(tert-butyl)phosphine, tri(isopropyl) phosphine, tri(phenyl)phosphine, pyridine, 1,3-bis(diphenylphosphino)propane, 1,2-bis(diphenylphosphino) ethane, 2,2'-dipyridyl, 1,3-bis(diisopropylphosphino) propane, bis(2-diphenylphosphinoethyl)phenylphosphine, and 1,8-diazabicyclo[5.4.0]undec-7-ene.

* * * * *